Jan. 30, 1962     L. C. STENNING     3,019,436

RADIO NAVIGATION SYSTEMS

Filed March 26, 1959     5 Sheets-Sheet 1

INVENTOR
LUIS CHARLES STENNING

BY
Kirschstein, Kirschstein & Ottinger
ATTORNEYS

Jan. 30, 1962  L. C. STENNING  3,019,436
RADIO NAVIGATION SYSTEMS
Filed March 26, 1959  5 Sheets-Sheet 2

INVENTOR
LUIS CHARLES STENNING
BY
Fischstein, Fischstein & Ottinger
ATTORNEYS

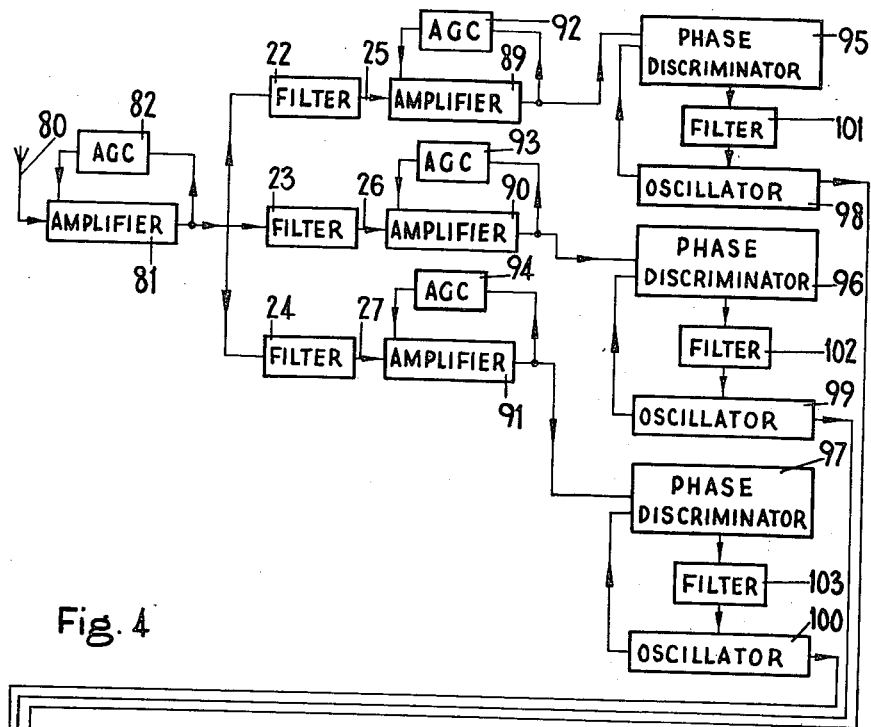
Fig. 4
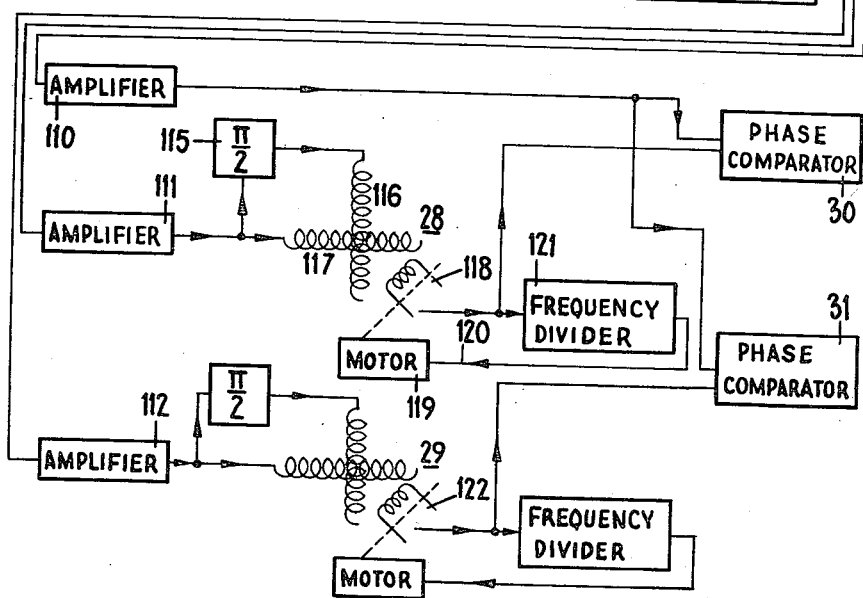

Jan. 30, 1962

L. C. STENNING 3,019,436

RADIO NAVIGATION SYSTEMS

Filed March 26, 1959

INVENTOR
LUIS CHARLES STENNING

BY
ATTORNEYS

Jan. 30, 1962     L. C. STENNING     3,019,436
RADIO NAVIGATION SYSTEMS

Filed March 26, 1959     5 Sheets-Sheet 5

INVENTOR
LUIS CHARLES STENNING

ATTORNEYS

United States Patent Office 3,019,436
Patented Jan. 30, 1962

3,019,436
RADIO NAVIGATION SYSTEMS
Luis Charles Stenning, Beaconsfield, England, assignor to The General Electric Company Limited, London, England
Filed Mar. 26, 1959, Ser. No. 802,147
Claims priority, application Great Britain Mar. 31, 1958
15 Claims. (Cl. 343—105)

This invention relates to radio navigation systems.

More particularly the present invention relates to radio navigation systems of the kind in which a measure of the position of a vehicle, which may, for example, be an aircraft or a ship, is given by the relative phase relationship of electromagnetic waves received by a co-operating apparatus on the vehicle from at least three geographically spaced radio transmitters. Throughout this specification radio navigation systems of this kind will be referred to as hyperbolic navigation systems.

One object of the present invention is to provide, in a hyperbolic navigation system, improved apparatus which is arranged to distinguish received signals which have closely spaced frequencies and to determine the phase relationship between these received signals.

It is another object of the present invention to provide an improved hyperbolic navigation system in which the transmitters are arranged to transmit signals having closely spaced frequencies.

According to a first aspect of the present invention, apparatus in a hyperbolic navigation system comprises: radio receiving means to receive first and second input signals having first and second frequencies respectively, these frequencies being different from one another; filter means to separate the first and second input signals into different channels; a device for producing from the first input signal a rotary electric field, pick-up means coupled with the rotary field, means for producing relative rotation between the pick-up means and the said device, and means for automatically controlling the said relative rotation such that the frequency of the output signal derived from the pick-up means is equal to the frequency of the second input signal; and phase comparing means for determining the phase relationship between the output signal derived from the pick-up means and the said second input signal.

The said electric field may be an electromagnetic or an electrostatic field, whilst the means for producing said relative rotation may be a synchronous electric motor.

According to a second aspect of the present invention, a hyperbolic navigation system includes first, second and third geographically spaced transmitters arranged, in operation, to transmit first, second and third frequencies respectively, these frequencies being different from one another, and apparatus which is arranged, in operation, to cooperate with the said transmitters, the said apparatus comprising: radio receiving means to receive the said three signals and to supply three corresponding signals which are hereinafter referred to as the first, second and third input signals respectively and which may have the same frequencies as the received signals; filter means to separate the first, second and third input signals into different channels; a first device for producing from the first input signal a first rotary electric field, first pick-up means coupled with the first rotary field, means for producing relative rotation between the first pick-up means and the first device, means for automatically controlling the relative rotation between the first pick-up means and the first device such that the frequency of the output signal derived from the first pick-up means is equal to the frequency of said third input signal, and first phase comparing means for determining the phase relationship between the output signal derived from the first pick-up means and the third input signal; a second device for producing from the second input signal a second rotary electric field, second pick-up means coupled with the second rotary field, means for producing relative rotation between the second pick-up means and the second device, means for automatically controlling the relative rotation between the second pick-up means and the second device such that the frequency of the output signal derived from the second pick-up means is equal to the frequency of the third input signal, and second phase comparing means for determining the phase relationship between the output signal derived from the second pick-up means and the third input signal; the said first and second phase comparing means providing an indication of the geographical location of the said apparatus.

The said first and second electric fields may be electromagnetic or electrostatic fields whilst the means for producing said relative rotation between the first pick-up means and the first device and the means for producing said relative rotation between the second pick-up means and the second device may be first and second synchronous electric motors respectively.

The said means for automatically controlling the relative rotation between the first pick-up means and the first device may comprise a first feedback loop including a frequency divider so arranged that, in operation, the first feedback loop supplies to the said first electric motor a signal the frequency and phase of which is dependent upon the frequency and phase respectively of the output signal derived from the first pick-up means, and the said means for automatically controlling the relative rotation between the second pick-up means and the second device may comprise a second feedback loop including a frequency divider so arranged that, in operation, the second feedback loop supplies to the said second electric motor a signal the frequency and phase of which is dependent upon the frequency and phase respectively of the output signal derived from the second pick-up means.

Means may be provided for deriving said input signals from the signals received by said radio receiving means by frequency multiplication or division.

A hyperbolic navigation system in accordance with the present invention will now be described by way of example with reference to the accompanying drawings in which:

FIG. 2 shows schematically three transmitters of a system and a cooperating apparatus, the cooperating apparatus being of the form which each vehicle which is to make use of the system will be provided with;

FIG. 4 shows the cooperating apparatus of FIG. 2 in more detail;

General considerations

The manner in which a hyperbolic navigation system operates will first be considered.

If, for simplicity, only two transmitters are considered, these transmitters transmitting signals which are in phase with one another and which have the same frequency, and further, that the two transmitters are separated by a distance which is equal to one wavelength at the frequency of the transmitted signals, then it will be realised that the locus of points at which the two received signals have a given phase relationship in a hyperbola with the two transmitters situated at its foci. (To be strictly correct it should perhaps be stated that the locus of such points is a hyperboloid but even in the application of hyperbolic navigation systems to aircraft this is a secondary factor which is not normally considered.) It follows that if two pairs of transmitters are provided the position of a co-operating apparatus on a vehicle, which apparatus includes radio receiving means (and which is assumed to be able to receive and distinguish between the signals transmitted from each transmitter) may be obtained as the intersection of two hyperbolae, one corresponding to the measured phase relationship of the signals transmitted from each of the two pairs of transmitters respectively. For convenience and economy of equipment one transmitter is frequently arranged to be common to each of the pairs.

In a practical system the transmitters will be separated by a distance which is large compared with a wavelength at the frequency of the transmitted signals and it will be realised that, considering for the moment a single pair of transmitters only, the locus of points at which the two received signals have a given phase relationship will be a family of hyperbolae all of which have as their foci the positions of the two transmitters.

Figure 1:
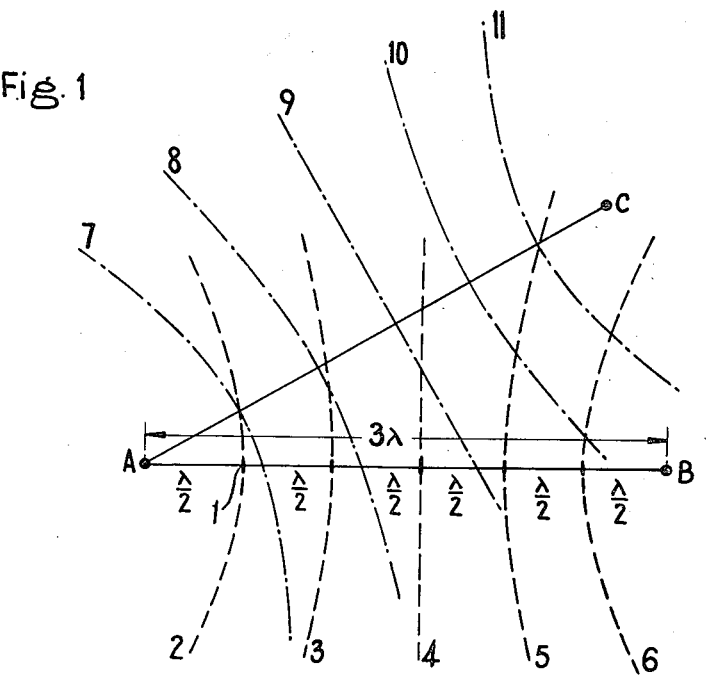
FIG. 1 shows a hyperbolic navigation system in diagrammatic form.

This may be seen by reference to FIGURE 1 of the accompanying drawing which shows such a system in diagrammatic form. In this case the two transmitters A and B of a pair are separated by a distance equal to three wavelengths ($3\lambda$) at the frequency of the transmitted signals and therefore, since the two transmitters A and B are transmitting in phase, the two signals will be in phase at transmitter A. Moving along the base line AB (the straight line joining transmitter A to transmitter B) the phase relationship between the two signals will change until at a point 1, at a distance equal to half a wavelength ($\lambda/2$) at the frequency of the transmitted signals from the transmitter A, the signals will again be in phase. Thus a hyperbola 2 of a family of hyperbolae of zero phase displacement, this family being shown with broken lines in FIGURE 1, will intersect the base line AB at the point 1. It will readily be appreciated that the remaining hyperbolae 3, 4, 5 and 6 of the family will intersect the base line AB at $\lambda/2$ intervals along its length.

If now another transmitter, the transmitter C, is provided, the transmitter C also being at a distance equal to three wavelengths ($3\lambda$) at the frequency of the transmitted signals from transmitter A then a second family of hyperbolae 7, 8, 9, 10 and 11 of zero phase displacement between the signals radiated from transmitter A and transmitter C will intersect the base line AC at intervals of $\lambda/2$. This second family are shown with chain dotted lines in FIGURE 1.

If then a co-operating apparatus on a vehicle, which apparatus includes radio receiving means (which it is assumed to be able to receive and distinguish between the signals radiated from the transmitters A, B and C) is in such a position that there is no phase displacement between signals received from transmitter A and transmitter B or between signals received from transmitter A and transmitter C then the apparatus is known to be at a point where a hyperbola of the first family intersects a hyperbola of the second family.

Although families of hyperbolae of zero phase displacement have been considered and shown in FIGURE 1, it will be appreciated that families of hyperbolae indicating the locus of points where the phase displacement between the signals received from two transmitters has any value from zero to 360° may be considered.

From the foregoing discussion it will be seen that in such a system the position of a co-operating apparatus is not known unambiguously unless its approximate position is known or unless means is provided for knowing which hyperbola of each family of hyperbolae the co-operating apparatus is situated on.

In this simplified discussion it has, until now, been assumed that all the transmitters are transmitting signals of the same frequency but, in fact, if such were the case, the received signal at any point would be the vector sum of individual signals arriving at that point from the individual transmitters and the co-operating apparatus would not be able to distinguish one from another. In a practical hyperbolic navigation system, therefore, each transmitter transmits on a different frequency and the co-operating apparatus is arranged to bring these individual frequencies to a common frequency for the purpose of determining their phase relationship. In one known system first, second and third transmitters are arranged to transmit signals having frequencies of 60 kilocycles per second, 80 kilocycles per second and 90 kilocycles per second respectively. A co-operating apparatus is then arranged to determine the required phase relationship between the signals received from the first and second transmitters, after bringing them to a common frequency of 240 kilocycles per second, and between the signals received from the first and third transmitters, after bringing them to a common frequency of 180 kilocycles per second.

In deciding upon the frequencies at which the transmitters are to operate a number of factors must be taken into account, such as, the availability of frequency channels in an already overcrowded frequency spectrum, and the transmission characteristics of signals having the frequencies selected when considered in relation to the range over which the system is to be operative. In addition, the values of the frequencies selected will determine the spacing between hyperbolae of equal phase relationship, and this factor must be considered in relation to the proposed spacing between transmitters and the proposed means, if any, provided for determining the approximate position of a co-operating apparatus, or on which of a plurality of hyperbolae the apparatus is situated at a given time. As in many cases the first of these factors is the most important it would be convenient if the frequencies selected for the transmitted signals could be as nearly as possible the same so that a single comparatively narrow frequency band could be allocated to the system.

A hyperbolic navigation system in accordance with the present invention will now be considered.

General arrangement

Figure 2:
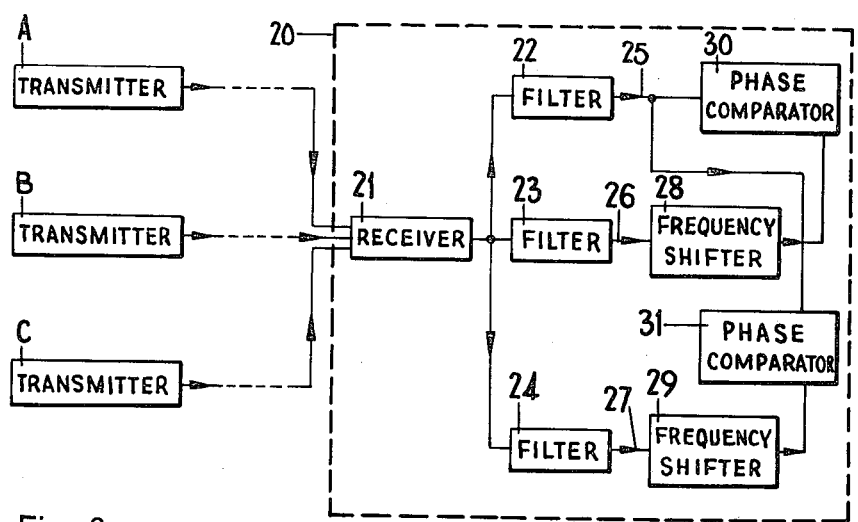

Referring now to FIGURE 2 of the drawings, the hyperbolic navigation system to be described includes three transmitters; a master transmitter A and two slave transmitters B and C, which are geographically spaced from one another and which, in operation, transmit signals comprising continuous or substantially continuous electromagnetic waves of 15 kilocycles per second, 15 kilocycles per second plus approximately 30 cycles per second and 15 kilocycles minus approximately 30 cycles per second respectively.

This order of frequency is chosen so that the system may be operable over a reasonably long range. The three frequencies are also chosen to be close together in the frequency spectrum in order to assist allocation problems and to ensure that the propagation conditions are as nearly as possible the same for the signal transmitted by each transmitter A, B or C. The amounts by which the frequencies of the signals transmitted by the slave transmitters B and C are displaced from the frequency of the signal transmitted by the master transmitter A need not be equal although, as the design and manufacture of the equipment for the slave transmitters B and C is simplified if the displacements are equal, it will be assumed throughout this description that this is the case.

Each moving vehicle, such as, for example, an aircraft or a ship, which is to make use of the system is provided with a co-operating apparatus 20 which includes a radio receiver 21 arranged to receive the signal transmitted from each of the transmitters A, B and C. The received signals pass from the receiver 21 to three filters 22, 23 and 24 which separate the signals received from the transmitters A, B and C into three channels 25, 26 and 27 respectively. The signals in channels 26 and 27 are then supplied to frequency shifters 28 and 29 respectively, the frequency shifters 28 and 29 being arranged to change the frequency of the signals appearing in the channels 26 and 27 respectively to provide two derived signals the frequency of each of which is the same as the frequency of the signal appearing in the channel 25.

The derived signal supplied by the frequency shifter 28 is then supplied to a phase comparator 30 where its phase is compared with the phase of the signal appearing in the channel 25. Similarly, the derived signal supplied by the frequency shifter 29 is supplied to a phase comparator 31 where its phase is compared with the phase of the signal appearing in the channel 25.

Since each of the phase relationships determined by the phase comparators 30 and 31 determines a family of hyperbolae on which the phase relationship between the signals received from the master transmitter A and the slave transmitter B and from the master transmitter A and the slave transmitter C respectively have the determined values, then the position of the co-operating apparatus 20 is known to be a point at which a hyperbola of one of these families intersects a hyperbola of the other family.

*Transmitters*

A previously indicated the master transmitter A transmits at a frequency of 15 kilocycles per second, the signals transmitted by the slave transmitters B and C being displaced approximately 30 cycles per second on each side of this frequency respectively. The frequencies of the slave transmitters B and C are, in fact, derived by receiving at each of the slave transmitters B and C the signal transmitted by the master transmitter A and subjecting that signal to the required frequency displacement. The magnitude of this displacement is decided by possible frequency variations at a co-operating apparatus on a vehicle due to propagation effects and the speed of the vehicle carrying the co-operating apparatus 20, and the degree of frequency selectivity which may conveniently be provided in the input stages of the co-operating apparatus 20. The displacement frequency for slave transmitters B and C is derived from the frequency of the master transmitter A by frequency division or a counting technique. In the numerical example given above, a counting train of nine binary stages giving a division of $2^9$, i.e. 512, would be necessary to give the required displacement of approximately 30 cycles per second. Translating this into general terms it can be said that if the frequency of the signal transmitted by the master transmitter A is F and the number of binary stages used is such as to bring about a division by a factor $n$, then the frequencies of the signals transmitted by the slave transmitter B and the slave transmitter C will be $$F\left(1+\frac{1}{n}\right) \text{ and } F\left(1-\frac{1}{n}\right)$$

respectively.

As the output from a frequency divider formed of a counting train of binary stages is normally a signal comprising rectangular pulses it is necessary to convert this signal to a continuous sinusoidal oscillation the frequency and phase of which will, at any instant, represent the frequency and phase of the signal received from the master transmitter A divided by $n$. This may be done by passing the pulse signal through a suitable low pass filter.

The master transmitter A and the slave transmitters B and C are arranged to transmit signals which are in phase at a given instant in time so that at any subsequent time their phase relationship is known. The necessary synchronisation of the slave transmitters B and C with the master transmitter A may be maintained by bringing about the frequency displacement of the signals transmitted by the transmitters B and C by the following method.

Figure 3:
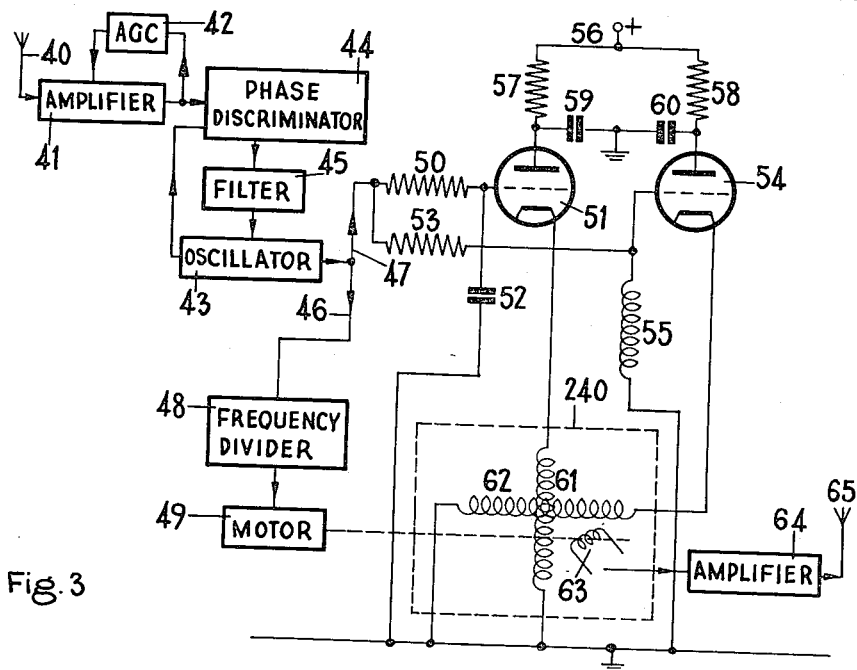
FIG. 3 shows one of the transmitters of FIG. 2 in more detail.

Referring now to FIGURE 3 of the drawings, which shows one of the slave transmitters, the slave transmitter B say, this includes an antenna 40 arranged to pick up the signal transmitted by the master transmitter A, this received signal then being amplified by an amplifier 41 having an automatic gain control circuit 42.

In order to give continuity of operation of the slave transmitter B during any possible break in the signal received from the master transmitter A, due for example, to fading, a highly stable local oscillator 43 which normally generates a signal having a frequency F, the same as the frequency transmitted by the master transmitter A, is provided in the input stages of the slave transmitter B. With this arrangement the signal, due to the signal received from the master transmitter A, passes from the amplifier 41 to a phase discriminator 44 together with a signal, having the same frequency as the signal received from the master transmitter A, fed back from the local oscillator 43. The phase discriminator 44 is arranged to provide an output direct current the polarity and amplitude of which is dependent upon the frequency and phase differences between the signal supplied thereto from the amplifier 41 and from the local oscillator 43, the amplitude of this direct current being zero when these differences are zero.

This direct current is then supplied by way of a low-pass filter 45 to the local oscillator 43 to control the frequency and phase of the signal produced thereby to agree with the frequency and phase respectively of the signal received from the master transmitter A. The signal produced by the local oscillator 43 is then used by the slave transmitter B in place of the signal received from the master transmitter A and will give continuity of operation for any short period when the signal from the master transmitter A is not received.

The output signal from the oscillator 43 is supplied over two paths 46 and 47 and, considering the path 46 for the moment, this supplies the signal from the local oscillator 43 to a frequency divider 48 which divides the frequency of the signal supplied by the local oscillator 43 by a factor $n$ and, as is a requirement of all the frequency dividers in the system, effectively divides the phase of the signal supplied thereto by a factor $n$ also. Thus at any time the frequency and the phase of the output signal from the frequency divider 48 is accurately related to the frequency and phase of the signal supplied to the frequency divider 48. The output signal from the frequency divider 48, which has a frequency of $F/n$, is then supplied to a rotating field synchronous electric motor 49 so that the motor 49 is controlled to operate at a speed of $F/n$ revolutions per second and with a phase which is at all times locked to the phase of the signal supplied by the frequency divider 48 and thus bears a known (although continuously varying) relation to the phase of the signal supplied by the local oscillator 43.

(As mentioned above the frequency division of the signal supplied by the local oscillator 43 may be brought about by a counting technique.)

Those parts of the transmitter B so far described are all of well known form and have therefore been shown schematically in FIGURE 3 of the drawings. The part of the slave transmitter B now to be described is, however, of less well known form and the full circuit of this part of the slave transmitter B is therefore shown in FIGURE 3.

Considering now the path 47 from the local oscillator 43, the signal supplied over the path 47 passes to one terminal of a resistor 50 the other terminal of which is connected to the control grid of a triode thermionic valve 51. The control grid of the triode 51 is also connected to earth by way of a capacitor 52. The output signal supplied by the local oscillator 43 is also supplied by way of a resistor 53 to the control grid of a second triode thermionic valve 54, the control grid of the triode 54 being connected to earth through an inductor 55. The values of the resistors 50 and 53, the capacitor 52 and the inductor 55 are arranged to be such that the signals appearing at the control grids of the triodes 51 and 54 are 90 degrees out of phase relative to one another.

A suitable positive bias is applied to the anodes of the triodes 51 and 54 from a terminal 56 by way of resistors 57 and 58 respectively. The junction between the resistor 57 and the anode of the triode 51 is connected to the junction between the resistor 58 and the anode of the triode 54 by way of capacitors 59 and 60 in series, the junction of the capacitors 59 and 60 being earthed.

It will be appreciated that the oscillatory component of the anode currents flowing through the triodes 51 and 54 will be 90 degrees out of phase. These currents are then arranged to flow through two coils 61 and 62 disposed with their axes at right angles to one another on a common support (not shown) and hence there is produced in the region of the coils 61 and 62 a rotary electromagnetic field which, in effect, has a speed of rotation equal to the frequency of the applied oscillation, that is to say, equal to the frequency of the signal supplied by the local oscillator 43.

A pick-up coil 63 is mounted for rotation within the electromagnetic field of the coils 61 and 62 so that the frequency of the oscillatory signal induced in the pick-up coil 63 is dependent upon the speed and direction of rotation of the pick-up coil 63 relative to those of the rotary electromagnetic field. The pick-up coil 63 is in fact arranged to be driven by the motor 49 and the frequency of the signal induced in the pick-up coil 63 will therefore be $$F + \frac{F}{n} \text{ or } F - \frac{F}{n}$$

depending upon the direction of the rotation of the pick-up coil 63. The sense in which the pick-up coil 63 is arranged to be rotated is different for the slave transmitters B and C which are, apart from this feature, similar to one another. Thus, in the case of the slave transmitter B, the signal induced in the pick-up coil 63 has a frequency $$F\left(1 + \frac{1}{n}\right)$$

and in the case of the slave transmitter C the signal induced in the corresponding pick-up coil has a frequency $$F\left(1 - \frac{1}{n}\right)$$

The general arrangement for frequency shifting by means of a rotary electric field associated with a pick-up means is described in the specification of British Patent No. 637,996.

The output signal from the pick-up coil 63 is derived by means of slip rings and brushes (not shown), this signal then being supplied to the final amplifier stages 64 of the slave transmitter B and thence to an antenna 65 from which the signal is radiated.

Subjected to the modification mentioned in connection with the sense of the rotation of the pick-up coil corresponding to the pick-up coil 63 the slave transmitter C is similar to the slave transmitter B.

With the arrangement which has been described for the slave transmitters B and C the phase of the signals which are transmitted by the slave transmitters B and C are locked in their phase relationship with the signal transmitted by the master transmitter A.

*Receivers*

In a co-operating apparatus on a vehicle the three signals transmitted by the three transmitters A, B and C are received, separated into three channels, brought to a common frequency, and then the phase of the signals received from the slave transmitters B and C are compared with the phase of the signal received from the master transmitter A. The signals due to the three transmitters A, B and C may be represented as F′, $$F''\left(1 + \frac{1}{n}\right) \text{ and } F'''\left(1 - \frac{1}{n}\right)$$

respectively where F′, F″ and F‴ represent signals having a frequency F but different phases dependent upon the distances between the three transmitters A, B and C and the co-operating apparatus respectively.

Referring now to FIGURE 4 of the drawings, which shows the co-operating apparatus 20 of FIGURE 2 of the drawings in more detail although still in schematic form, the signals transmitted by the three transmitters A, B and C are received at the co-operating apparatus on a vehicle by an antenna 80 which supplies the received signals to an amplifier 81 having an automatic gain control circuit 82. The signal from the amplifier 81 is then supplied to the three crystal filters 22, 23 and 24 which separate the signals due to the transmitters A, B and C into the three separate channels 25, 26 and 27 respectively. The channels 25, 26 and 27 each contain further amplifiers 89, 90 and 91 respectively having automatic gain control circuits 92, 93 and 94 respectively.

From the amplifiers 89, 90 and 91 the signals are supplied to phase discriminators 95, 96 and 97 together with signals fed back from highly stable local oscillators 98, 99 and 100 respectively.

The local oscillators 98, 99 and 100 are provided in order to give continuity of operation in the co-operating apparatus during any short break in the signal received from one or more of the transmitters A, B or C, due for example, to fading. The local oscillator 98 is normally arranged to generate a signal having a frequency F (equal to the frequency of the signal transmitted by the master transmitter A), the local oscillator 99 is normally arranged to generate a signal having a frequency $$F\left(1 + \frac{1}{n}\right)$$

(equal to the frequency of the signal transmitted by the slave transmitter B), whilst the local oscillator 100 is normally arranged to generate a signal having a frequency $$F\left(1 - \frac{1}{n}\right)$$

(equal to the frequency of the signal transmitted by the slave transmitter C).

Considering one channel only for the moment, the channel 25 say, there is supplied to the phase discriminator 95 the signal received from the master transmitter A together with a signal, having the same frequency as the signal received from the master transmitter A, fed back from the local oscillator 98. The phase discriminator 95 is arranged to provide an output direct current the polarity and amplitude of which is dependent upon the frequency and phase differences between the signals supplied thereto by the amplifier 89 and the local oscillator 98, the amplitude of this direct current being zero when these differences are zero.

This direct current is then supplied by way of a low-pass filter 101 to the local oscillator 98 to control the frequency and phase of the signal produced thereby to agree with the frequency and phase respectively of the signal supplied from the amplifier 89. The signal produced by the local oscillator 98 is then used in the subsequent stages of the co-operating apparatus in place of the signal received from the master transmitter A and will give continuity of operation for any short period when the signal from the master transmitter A is not received.

The local oscillators 99 and 100 operate in a similar manner in respect of the signals, in the two remaining channels 26 and 27 received from the slave transmitters B and C, low-pass filters 102 and 103 similar to the low-pass filter 101 being provided between the phase discriminator 96 and the local oscillator 99 and the phase discriminator 97 and the local oscillator 100 respectively.

The signals from the local oscillators 98, 99 and 100 are supplied to amplifiers 110, 111 and 112 respectively and the necessary frequency shift of the signals supplied by the amplifiers 111, 112 due to the signals received from the slave transmitters B and C respectively is brought about by two similar frequency shifters generally designated by the reference numerals 28 and 29 respectively.

The frequency shifter 28, which will now be described in more detail, comprises an arrangement 115 which is arranged to derive from the signal supplied by the amplifier 111 an oscillatory signal having the same frequency as the signal supplied by the amplifier 111 but displaced by 90 degrees in phase from that signal. The displaced signal from the arrangement 115 is then supplied to a coil 116, whilst the signal direct from the amplifier 111 is supplied to a coil 117, the coils 116 and 117 being disposed with their axes at right angles to one another on a common support (not shown), so that there is produced in the region of the coils 116 and 117 a rotary electromagnetic field which, in effect, has a speed of rotation equal to the frequency of the signal supplied by the amplifier 111. A pick-up coil 118 is mounted for rotation within the field for the coils 116 and 117 and hence the frequency and phase of the oscillatory signal produced in the pick-up coil 118 is dependent upon the speed, shaft angle and direction of rotation thereof, relative to those of the rotary electromagnetic field.

The required rotation of the pick-up coil 118 is brought about by a rotating field synchronous electric motor 119 which is operated by an oscillatory voltage supplied by a feedback loop 120 from the output terminals of the pick-up coil 118, the pick-up coil 118 being connected to these output terminals by means of slip rings and brushes. The feedback loop 120 includes a frequency divider 121 which is arranged to divide the frequency of the signal fed back by a factor $n$ so that the electric motor 119 is controlled to operate at the speed ($F/n$ revolutions per second) and with the phase which is required.

When the arrangement 28 is operating the pick-up coil 118 is rotating at a speed $F/n$ revolutions per second so that the frequency of the signal induced in the pick-up coil 118 will be $$F\left(1+\frac{1}{n}\right) \pm \frac{F}{n}$$

depending upon the sense in which the pick-up coil 118 is rotated. In the case of the channel 26 now being considered the sense of the rotation of the pick-up coil 118 is such that a signal of frequency F is induced therein. The frequency shifter 29 is similar to the frequency shifter 28 described above except that in this case the pick-up coil 122 is rotated in the opposite sense to the pick-up coil 118 so that the signal induced therein again has a frequency F.

At this stage in the co-operating apparatus the signals appearing in the three channels 25, 26 and 27 are all of frequency F although, due to the differing distances of the transmitters A, B and C from the co-operating apparatus these signals may differ in phase. The signals in the three channels 25, 26 and 27 will hereafter be designated F′, F″ and F‴ respectively indicating signals having the same frequency but, possibly, differing in phase.

The signal F″ derived from the pick-up coil 118 is then supplied to the phase comparator 30 together with the signal F′ from the amplifier 110, and the signal F‴ derived from the pick-up coil 122 is supplied to the phase comparator 31 together with the signal F′ from the amplifier 110. The phase comparators 30 and 31 thus determine the phase relationship between the signals received from the master transmitter A and the slave transmitter B and between the signals received from the master transmitter A and the slave transmitter C respectively. As previously mentioned, each of these relations determines a family of hyperbolae on which the phase relationship between the signals received from the master transmitter A and the slave transmitter B, and from the master transmitter A and the slave transmitter C have the determined values. The position of the co-operating apparatus is therefore known to be a point at which a hyperbola of one of these families intersects a hyperbola of the other family.

It is now necessary to consider some of the features of the co-operating apparatus shown in FIGURE 4 of the drawing in more detail.

It will be appreciated that the automatic gain control circuit 82 is desirable because of the large variations in the strength of the signals received from the three transmitters A, B and C as the co-operating apparatus moves relative to them. In addition, the strength of the signals received from the three transmitters A, B and C will vary relative to one another due to changes in the relative distance of the co-operating apparatus from the transmitters A, B and C. Since the automatic gain control circuit 82 will determine the gain setting of the amplifier 81 in dependence upon the strongest of the received signals, a method of operation which is necessary in order to prevent overloading of the amplifier 81, then it will be appreciated that the signal, due to one other transmitter or both the other transmitters, supplied by the amplifier 81 may be weak relative to the signal supplied by the amplifier 81 due to the nearest transmitter. Since however, after separation by the filter 22, 23 and 24 the signals are separately amplified by the amplifiers 89, 90 and 91 each having its own automatic gain control circuit 92, 93 or 94 respectively these inequalities in the strength of the signals supplied by the amplifier 81 are compensated.

The frequency selectivity of the filters 22, 23 and 24 is determined after consideration of a number of factors. Clearly each filter 22, 23 and 24 must have a pass band which includes the frequency of the transmitter A, B or C respectively, which is to be passed into the relevant channel 25, 26 or 27, whilst having a high attenuation at the frequencies of the other two transmitters. Also, in order to minimise interference from other transmitters not forming part of the navigation system under consideration, it is desirable that the filters 22, 23 and 24 should have as narrow a pass band as possible. This requirement is, however, limited by the following factors; first, apparent frequency shift of signals received from the transmitters A, B and C due to the velocity of the vehicle carrying the co-operating apparatus, second, the frequency stability of the signals transmitted from transmitters A, B and C. Considering the velocity of the co-operating apparatus, as the vehicle moves away from or towards a transmitter A, B or C a slight positive or negative doppler frequency shift is imparted to the signal from that transmitter, an effect which increases with the speed of the vehicle. Although this factor does not become important except at high speeds it should be considered in order that phase errors are not introduced in the co-operating apparatus which would degrade the accuracy of the system when the co-operating apparatus is moving.

Figure 5:
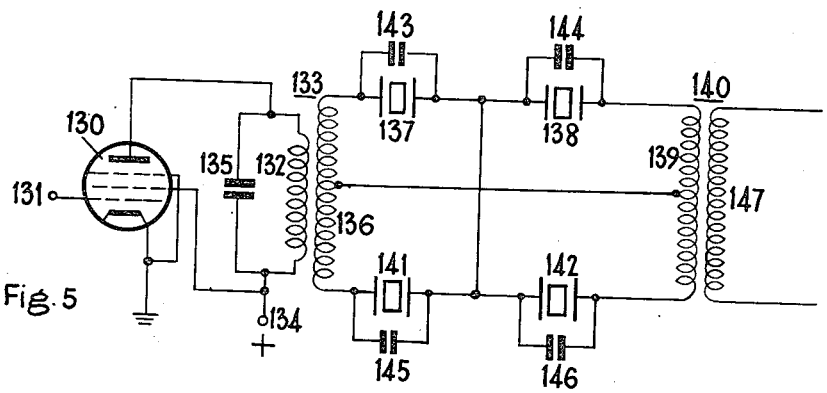
FIG. 5 shows a first part of the cooperating apparatus of FIG. 4 in more detail.

One of the filters 22, 23 or 24 is shown in more detail in FIGURE 5 of the drawing. The filter includes a pentode thermionic valve 130 the control grid of which is connected to an input terminal 131 whilst the anode is connected to one terminal of the primary winding 132 of a transformer 133. The other terminal of the winding 132 is connected to a terminal 134 maintained at a positive potential relative to earth, the terminal 134 also being connected to the screen grid of the pentode 130. The suppressor grid of the pentode 130 is connected to its cathode which is earthed. A capacitor 135 is connected in parallel with the winding 132 to form a resonant circuit tuned to the frequency required in the channel 25, 26 or 27 under consideration.

One terminal of the secondary winding 136 of the transformer 133 is connected by way of crystals 137 and 138 in series to one terminal of the primary winding 139 of a transformer 140, the other terminal of the winding 136 of the transformer 133 being connected by way of crystals 141 and 142 in series to the other terminal of the winding 139 of the transformer 140. Capacitors 143, 144, 145 and 146 are provided in parallel with the crystals 137, 138, 141 and 142 respectively. The junction between the crystals 137 and 138 is connected to the junction between the crystals 141 and 142 and each of the windings 136 of the transformer 133 and 139 of the transformer 140 is provided with a centre tapping, these centre tappings being connected to one another. The output from the filter is derived from the secondary winding 147 of the transformer 140.

Figure 6:
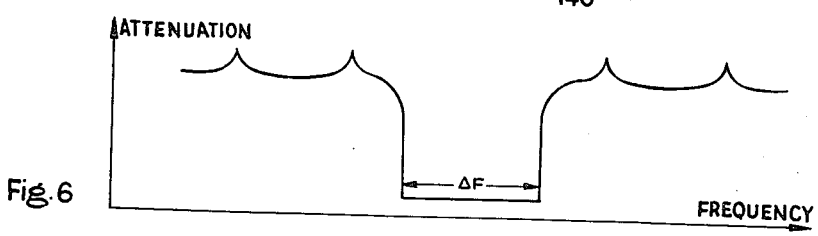
FIG. 6 shows a characteristic curve of the arrangement of FIG. 5.

The general form of the attenuation/frequency characteristic of a filter constructed as shown in FIGURE 5 is shown in FIGURE 6 of the drawings. The pass band $\Delta F$ is arranged to be approximately 30 cycles per second and to be centred on the frequency of the signal transmitted by one of the transmitters A, B or C which is to be passed into the channel 25, 26 or 27 respectively (FIGURE 4).

One of the frequency shifters 28 or 29 used for shifting the frequency of a signal received from one of the slave transmitters B or C to the frequency of the signal received from the master transmitter A will now be described with reference to FIGURE 7 of the drawings. The signal supplied from the amplifier 111, say (FIGURE 4), passes to one terminal of a resistor 150 the other terminal of which is connected to the control grid of a triode thermionic valve 151. The control grid of the triode 151 is also connected to earth by way of a capacitor 152. The signal supplied by the amplifier 111 (FIGURE 4) is also supplied by way of a resistor 153 to the control grid of a second triode thermionic valve 154, the control grid of the triode 154 being connected to earth through an inductor 155. The values of the resistors 150 and 153, the capacitor 152 and the inductor 155 are arranged to be such that the voltages appearing on the control grids of the triodes 151 and 154 are 90 degrees out of phase relative to one another.

A suitable bias, positive with respect to earth, is supplied to the anodes of the triodes 151 and 154 from a terminal 156 by way of resistors 157 and 158 respectively. The junction between the resistor 157 and the anode of the triode 151 is connected to the junction between the resistor 158 and the anode of the triode 154 by way of capacitors 159 and 160 in series, the junction of the capacitors 159 and 160 being earthed.

It will be appreciated that the oscillatory component of the anode currents flowing through the triodes 151 and 154 will be substantially 90 degrees out of phase. These currents are then arranged to flow through the two coils 116 and 117 disposed with their axes at right angles to one another on a common support (not shown) and hence there is produced in the region of the coils 116 and 117 a rotary electromagnetic field which, in effect, has a speed of rotation equal to the frequency of the signal supplied from the amplifier 111 (FIGURE 4), that is to say, equal to a frequency $$F\left(1+\frac{1}{n}\right)$$

The pick-up coil 118 is mounted for rotation within the electromagnetic field of the coils 116 and 117 so that the frequency of the oscillatory signal induced in the pick-up coil 118 is dependent upon the speed and direction of rotation of the pick-up coil 118 relative to those of the rotary electromagnetic field.

The signal induced in the pick-up coil 118 is supplied to the frequency divider 121 which divides the frequency of the signal induced in the coil 118 by a factor $n$. The output signal from the frequency divider 121 is then supplied to the electric motor 119 which is arranged to drive the coil 118.

It may be convenient for the frequency divider 121 to divide the frequency of the signal induced in the coil 118 by a factor $r$ and for the motor 119 then to drive the coil 118 through reduction gearing 164, the reduction gearing 164 introducing a reduction factor $s$ where $rs=n$. In addition, a slipping clutch may be provided in the drive between the motor 119 or the gearing 164 and the coil 118 for a reason which will be apparent hereafter.

It should be appreciated that the frequency shift arrangements 28 and 29 described for the slave transmitters B and C and for use in the channels 26 and 27 corresponding to the slave transmitters B and C in a co-operating apparatus afford a measure of compensation for any slight drift of frequency of the signal transmitted by the master transmitter A. Thus if the frequency transmitted by the master transmitter A drifts from frequency F to a new frequency $F+dF$ the frequency of the signal produced by the frequency divider 48 (FIGURE 3) in the slave transmitter B will drift to $$\frac{1}{n}(F+dF)$$

so that the signal transmitted by the slave transmitter B becomes:

$$F+dF+\frac{1}{n}(F+dF)$$

i.e.

$$(F+dF)\left(1+\frac{1}{n}\right)$$

If then the signal supplied to the phase comparator 30 (FIGURE 4) due to the slave transmitter B has a frequency F? then the frequency divider 121 will be supplying a signal of frequency $$\frac{F?}{n}$$

to the motor 119 and the pick-up coil 118 will be rotated at $$\frac{F?}{n}$$

revolutions per second. The frequency of the signal induced in the pick-up coil 118 will therefore be:

$$(F+dF)\left(1+\frac{1}{n}\right)-\frac{F?}{n}$$

but this frequency is equal to F?, the frequency of the signal supplied to the phase comparator 30 therefore $$(F+dF)\left(1+\frac{1}{n}\right)-\frac{F?}{n}=F?$$

i.e.

$$(F+dF)\left(1+\frac{1}{n}\right)=F?\left(1+\frac{1}{n}\right)$$

so that $$F+dF=F?$$

which means that the signal supplied by the pick-up coil 118 to the phase comparator 30 has the same frequency as the signal supplied by the amplifier 110, which is the required condition.

The phase comparators 30 and 31 as shown in FIGURE 4 will now be described with reference to FIGURE 8 of the drawings, which shows one of these phase comparators 30 or 31 in more detail. The phase comparator comprises first and second phase comparers 170 and 171, a phase shifter 172 and a phase changer 173. The phase comparator is provided with two input terminals 174 and 175, input paths being provided between the terminal 174 and each of the phase comparers 170 and 171. An input path is also provided from the terminal 175 to the phase shifter 172, further paths being provided between the phase shifter 172 and the phase comparer 170 and between the phase shifter 172 and the phase comparer 171 by way of the phase changer 173. The phase changer 173 introduces a shift of 90 degrees in the phase of signals passing from the input terminal 175 to the phase comparer 171. The purpose of the phase shifter 172 which introduces a variable phase shift in the phase of signals supplied from the terminal 175 to either of the phase comparers 170 and 171 will be mentioned later.

The phase comparator also includes two triode thermionic valves 176 and 177 the anodes of which are connected to a supply line 178 which is maintained at a positive potential with respect to earth and the control grids of which are connected to the phase comparers 170 and 171 respectively. It is desirable that direct current amplifiers 179 and 180 should be provided between the phase comparers 170 and 171 and the control grids of the triodes 176 and 177 respectively.

The cathode of the triode 176 is connected by way of a resistor 181 and a coil 182 in series to earth, whilst the cathode of the triode 177 is connected by way of a resistor 183 and a coil 184 in series to earth. The junction of the resistor 181 and the coil 182 is connected to a supply line 185 which is maintained at a negative potential with respect to earth by way of a resistor 186 and the junction of the resistor 183 and the coil 184 is connected to the supply line 185 by way of the resistor 187. Resistors 188 and 189 are provided in series between the supply lines 178 and 185, the junction between the resistors 188 and 189 being earthed.

The coils 182 and 184 are mounted with their axes at right angles on a common support (not shown) so that when currents are flowing in the coils 182 and 184, a magnetic field is set up, this field being arranged to influence a small bar magnet 190 mounted for rotation about an axis such that the magnet 190 will align itself with respect to the vectorial sum of the magnetic fields associated with coils 182 and 184. It will be appreciated that the angular position of the magnet 190 provides a measure of the relationship existing between the currents flowing in the coils 182 and 184. It will be seen that the arrangement of crossed coils 182 and 184 supplied by triodes 176 and 177 is somewhat similar to the arrangements previously described with reference to frequency shifting. In the present case, however, the feeding arrangements are different because as will be apparent hereinafter the signals supplied to the control grids of triodes 176 and 177 may at some times be negative and it is necessary that, even when this is the case, the signals supplied to the coils 182 and 184 are not distorted.

Figure 8:
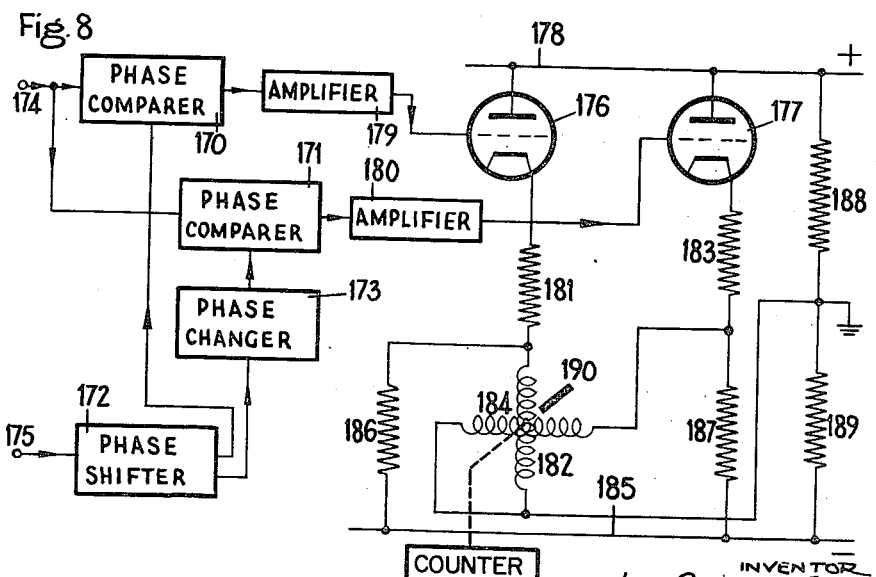
FIG. 8 shows a third part of the cooperating apparatus of FIG. 4 in more detail.
Figure 9:
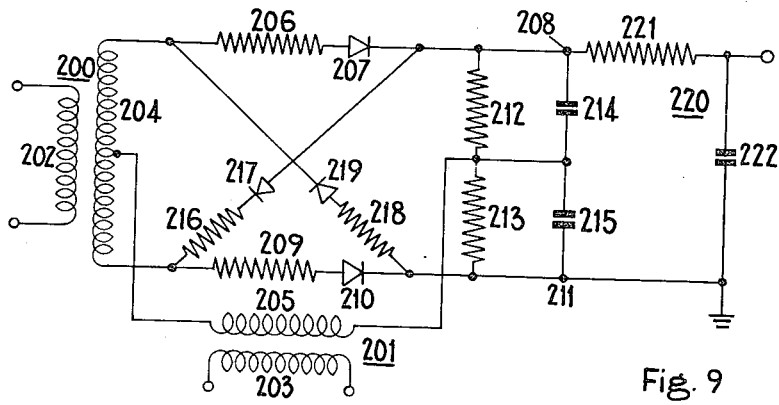
FIG. 9 shows a part of the arrangement of FIG. 8 in more detail.

The phase comparers 170 and 171 shown in FIGURE 8 will now be considered with reference to FIGURE 9 of the drawings, which shows one of these phase comparers 170 or 171 in more detail. The phase comparer comprises first and second transformers 200 and 201 having primary windings 202 and 203 respectively and secondary windings 204 and 205 respectively. One terminal of the winding 204 of the transformer 200 is connected by way of a resistor 206 and a rectifier element 207 in series to a terminal 208, whilst the other terminal of the winding 204 is connected by way of a resistor 209 and a rectifier element 210 in series to a terminal 211.

Two parallel-connected paths are provided connecting the terminal 208 to the terminal 211. The first of these paths contains resistors 212 and 213 in series whilst the second of these paths contains capacitors 214 and 215 in series. The terminal of the winding 204 adjacent the resistor 209 is connected by way of a resistor 216 and a rectifier element 217 in series to the terminal of the rectifier element 207 adjacent the terminal 208, whilst the terminal of the rectifier element 210 adjacent the terminal 211 is connected by way of resistor 218 and a rectifier element 219 in series to the terminal of the winding 204 adjacent the resistor 206.

The junction between the capacitors 214 and 215 is connected to the junction between the resistors 212 and 213 this latter junction also being connected by way of the winding 205 of the transformer 201 to a tapping at the mid-point of the winding 204 of the transformer 200.

The operation of the circuit of FIGURE 8 of the drawings will now be described making use also of FIGURE 9. For the purpose of this description it will be assumed that the phase comparator shown in FIGURE 8 is the phase comparator 30 (FIGURE 4) which is required to determine the phase relationship between signals appearing in channels 25 and 26 (FIGURE 4) that is to say between signals received from the master transmitter A and the slave transmitter B.

Employing the notation previously used, the signal supplied from the amplifier 110 (FIGURE 4) to the terminal 174 is represented as F′, this representing a signal having the frequency F of the signal transmitted by the master transmitter A but, a phase which is dependent upon the distance of the co-operating apparatus from the master transmitter A. Similarly, the signal supplied from the pick-up coil 118 (FIGURE 4) to the terminal 175 is represented by F″, this representing a signal originating from slave transmitter B whose frequency has been shifted to the frequency F of the signal transmitted by master transmitter A but which has a different phase dependent upon the distance of the co-operating apparatus from the slave transmitter B.

Referring for a moment to FIGURE 9 and considering the phase comparer 170, then the signals F′ and F″ are supplied to the windings 202 and 203 respectively. The phase comparer 170 is then arranged to give a direct current output the amplitude and polarity of which depends upon the phase relationship between the two signals F′ and F″ and, as the phase difference between F′ and F″ varies some 0 to $2\pi N$ radians (where N is an integer), the voltage of the output from the phase comparer 170 will show a cyclic variation with a period of $2\pi$. The phase comparer 171 operates in a similar manner but as the signal F″ is shifted in phase by 90 degrees by the phase changer 173 before being supplied to the phase comparer 171 then the variation in the voltage output from the phase comparer 171 is displaced by 90 degrees from the voltage output from the phase comparer 170.

It is preferable for the phase comparers 170 and 171 to have a narrow output band pass which may be achieved by providing each of them with a narrow pass band filter 220 comprising a resistor 221 and a capacitor 222 connected between the terminals 208 and 211.

The output voltages from the phase comparers 170 and 171 are then supplied by way of triodes 176 and 177 to the coils 182 and 184 so that the coils 182 and 184 produce a magnetic field which, in effect, rotates as the phase angle between the signals F' and F'' varies. The direction of rotation will depend upon the sign of the phase shift of 90 degrees introduced by the phase changer 173 and also upon whether F' is increasing in phase lead or in phase lag with respect to F''. One complete revolution will take place as the phase between F' and F'' varies from 0 to $2\pi$ radians. The magnet 190 turns with the field and therefore indicates the phase relationship existing between the signals F' and F''. The magnet 190 is provided with a pointer (not shown) and also an arrangement which records the number of complete revolutions made in one direction and substracts the number of complete revolutions made in the reverse direction. Thus as the co-operating apparatus travels relative to the master transmitter A and the slave transmitter B the pointer associated with the magnet 190 will indicate the number of hyperbolae of equal phase relationship traversed and also the fractional part of the distance to the next hyperbola of equal phase relationship.

The pointer associated with the magnet 190 can therefore give an indication of which family of hyperbolae (that is to say the family showing which phase relationship exists between the signals received from the master transmitter A and slave transmitter B), the co-operating apparatus is situated on. Since the phase comparator 31 (FIGURE 4) is performing in a similar manner with respect to the signals received from the master transmitter A and the slave transmitter C a fix is obtained at the intersection of two hyperbolae, one of each family.

Referring now to FIGURE 8 of the drawings, for the purpose of setting the apparatus prior to the start of a journey it is necessary that the position of the pointer associated with the phase comparators 30 and 31 may be varied independent of movement of the co-operating apparatus. Considering for the moment the phase comparator 30, this may be done by varying the phase shift introduced by the phase shifter 172 so that the phase of the signal received from the slave transmitter B and supplied to the phase comparers 170 and 171 is varied relative to the phase of the signal received from the master transmitter A and supplied to the phase comparers 170 and 171.

A similar phase shifter is provided in the phase comparator 31 so that the phase of the signal received from the slave transmitter C can be varied relative to the phase of the signal received from the master transmitter A.

Figure 7:
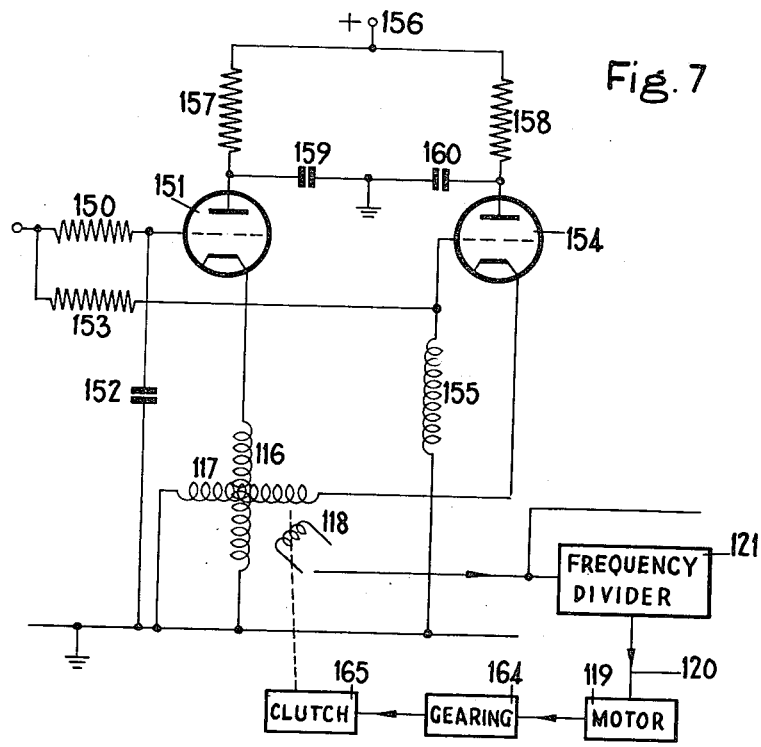
FIG. 7 shows a second part of the cooperating apparatus of FIG. 4 in more detail.

Alternatively, referring now to FIGURE 7 of the drawings, this adjustment can be brought about by operation of the two slipping clutches, corresponding to the clutch 165, in the drive to the pick-up coils 118 and 122 (FIGURE 4).

Whichever method is used, therefore, the position of the co-operating apparatus as indicated by the phase comparators 30 and 31 is adjusted to the known position of the vehicle prior to the journey by means of the phase shifters or clutches, which are then locked so as not to be altered during the journey.

*Modifications*

*Modifications to the general arrangement.*—Although the system described has been stated to include three transmitters A, B and C it will be appreciated that in certain circumstances more than three transmitters may be provided. In the case of a system employing four transmitters, for example, there may be a master transmitter A and three slave transmitters B, C and D. In this case the master transmitter A may transmit a signal of frequency F, the slave transmitter B may transmit a signal of frequency $$F\left(1+\frac{1}{n}\right)$$

the slave transmitter C may transmit a signal of frequency $$F\left(1-\frac{1}{n}\right)$$

and the slave transmitter D may transmit a signal of frequency $$F\left(1\pm\frac{2}{n}\right)$$

The slave transmitter D may then be similar in general arrangment to the slave transmitter described with reference to FIGURE 3 of the drawings, except that its frequency divider, corresponding to the frequency divider 48 in the slave transmitter shown in FIGURE 3, will divide by a factor $n/2$ instead of by a factor $n$.

In a co-operating apparatus associated with such a system the signals received from the four transmitters A, B, C and D will be separated into four channels and the signals in the channels corresponding to the slave transmitters B, C and D will be brought to the frequency of the signal appearing in the channel corresponding to the master transmitter A. Three phase comparators will then be provided for comparing the signals from each of the slave transmitters B, C and D with the signal received from the master transmitter A. These phase comparators will then indicate the position of the co-operating apparatus on three different families of hyperbolae thus giving an additional fix over the arrangement previously described.

As a further alternative a system making use of four transmitters A, B, C and D may include two master transmitters A and C and two slave transmitters B and D. In this case the master transmitter A may transmit a signal of frequency $F_1$ and the slave transmitter B may transmit a signal of frequency $$F_1\left(1\pm\frac{1}{n}\right)$$

whilst the master transmitter C transmits a signal of frequency $F_2$ and the slave transmitter D transmits a signal of frequency $$F_2\left(1\pm\frac{1}{n}\right)$$

Again the co-operating apparatus may be arranged to separate the signals received from the four transmitters A, B, C and D into four separate channels in the manner previously described.

Figure 10:
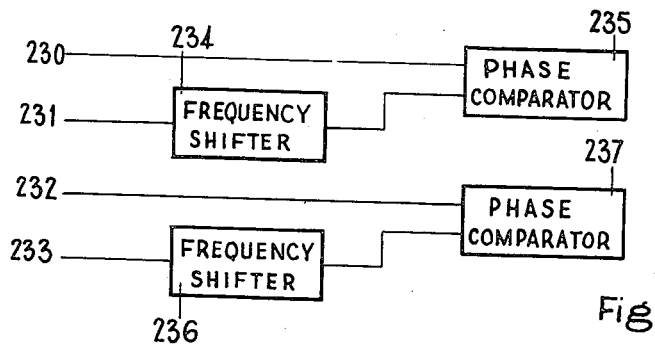
FIG. 10 shows a modification to a part of the apparatus of FIG. 4.

The latter stages of a co-operating apparatus associated with such a system will, however, be slightly different from that previously described and an example of such a co-operating apparatus is therefore shown in schematic form in FIGURE 10 of the accompanying drawings. In this figure the channels 230, 231, 232 and 233 carry signals corresponding to the master transmitter A, the slave transmitter B, the master transmitter C and the slave transmitter D respectively. The signal appearing in the channel 231 is passed to a frequency shifter 234 which shifts its frequency to be the same as the signal appearing in the channel 230, the signal supplied by the frequency shifter 234 then being supplied to a phase comparator 235 together with the signal appearing in the channel 230. Similarly, the signal appearing in the channel 233 passes to a frequency shifter 236 which is arranged to shift its frequency to be the same as the frequency appearing in the channel 232 the signal supplied by the frequency shifter 236 being supplied to a phase comparator 237 together with the signal appearing in the channel 232. In this arrangement the signals received from the four transmitters A, B, C and D only define two families of hyperbolae and the arrangement is therefore somewhat wasteful of transmitters. An extension of this system, however, to the case where there are six transmitters, made up of three master transmitters and three slave transmitters would have the advantage of still defining two families of hyperbolae, from which a fix could be obtained, even if one of the master transmitters were to break down completely, a safety feature which is not present in a system of this particular kind having only one or two master transmitters.

An additional feature which may be provided, and which may be of importance in cases where it is desired to operate the system using frequencies in a particularly sought after part of the frequency spectrum, is the transmission of intelligence, unconnected with the navigation system, by means of Morse signals. Thus a signal transmitted from say the master transmitter A may be interrupted in short or long periods to indicate dots and dashes respectively, the signal remaining in the normal condition between messages. As previously indicated the cooperating apparatus can be arranged not to be disturbed by such interruptions. It is possible that the frequency spectrum of the master transmitter A will spread across the frequencies at which the slave transmitters B and C are operating and, in the event of the Morse signal having an appreciable frequency component at the displacement frequency of the slave transmitters B and C from the master transmitter A, this would interfere with the reception of the signals from the slave transmitters B and C for the purposes of navigation. In this case it would be necessary to add an inhibiting device to prevent this effect reaching a serious magnitude.

*Modifications to the transmitters.*—In the slave transmitter described with reference to FIGURE 3 of the drawings the anode currents flowing in the triodes 51 and 54 are arranged to flow through the coils 61 and 62 for the purpose of creating an electromagnetic field in which the pick-up coil 63 is rotated. The coupling between the coils 61 and 62 and the circuit associated with the pick-up coil 63 is thus brought about electromagnetically. As an alternative, which will now be described, this coupling may be brought about electrostatically.

Figure 11:
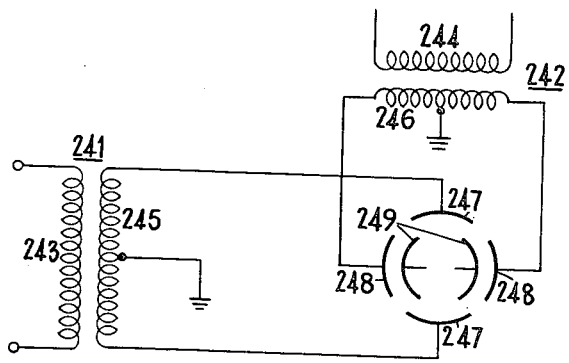
FIG. 11 shows a modification to a part of the transmitter of FIG. 3 or to a part of the arrangement of FIG. 7.

This alternative is shown in FIGURE 11 of the drawings which shows the part of the slave transmitter B or C of FIGURE 3 within the broken rectangule 240 in modified form. In this modified form this part of the slave transmitter B or C comprises two transformers 241 and 242 having primary windings 243 and 244 respectively and secondary windings 245 and 246 respectively. Each of the windings 245 and 246 has a centre tapping which is earthed. The modified form also includes two pairs of arcuate plates 247 and 248 which are insulated from one another and arranged to lie in a cylindrical surface. The ends of the winding 245 are connected to the arcuate plates 247 one to one and the ends of the winding 246 are connected to the arcuate plates 248 one to one.

In operation of the slave transmitter B or C shown in FIGURE 3 the anode currents of the triodes 51 and 54 are arranged to flow through the windings 243 and 244 (FIGURE 11) so that voltages are produced on the arcuate plates 247 and 248. As the anode currents of the triodes 51 and 54 are 90 degrees out of phase with one another as previously described, the voltages on the pairs of arcuate plates 247 and 248 are 90 degrees out of phase relative to one another also. In this modification the pick-up means comprises a pair of insulated arcuate plates 249 mounted for rotation close to and within the arcuate plates 247 and 248. The output voltage induced on the arcuate plates 249 is derived by means of slip rings and brushes or by capacity coupling (not shown) and is supplied to the amplifier 64 (FIGURE 3).

With this modification the pick-up means, that is to say, the pair of arcuate plates 249, is rotated by means of the motor 49 (FIGURE 3) so that as in the arrangement described with reference to FIGURE 3 of the drawings the required output frequency of the slave transmitter B or C is derived.

*Modifications to the receivers.*—Although in the form of receiver shown in FIGURE 4 and in particular in the part of the receiver shown in more detail in FIGURE 7 of the drawings, the required frequency shift of the signals received from the slave transmitters B and C is brought about electromagnetically, this frequency shift may, in fact, be brought about electrostatically in a very similar manner to that described for shifting the frequency in the slave transmitters B and C in the modification shown in FIGURE 11 of the drawings.

Although in the foregoing description it has been assumed that the determination of the phase relationship between the signals received from the transmitters A, B and C is carried out by bringing the three received signals to the frequency F of the signal transmitted by the master transmitter A, this is not an essential feature of the invention. Referring now to FIGURE 4 of the drawings, provided that the three received signals are brought to a common frequency for the purpose of determining their phase relationship the principle involved is not affected by equal frequency multiplication introduced in each of the three channels 25, 26 and 27 prior to, during, or subsequent to amplification in the amplifier 89, 90 and 91 or by frequency multiplication applied to all three signals simultaneously prior to the filters 22, 23 and 24. Thus the signals appearing in each of the channels 25, 26 and 27 may be multiplied by the same factor, and it should be noted that if the change of frequency is carried out prior to the filters 22, 23 and 24 it may result in some easing of the design requirements of the filters 22, 23 and 24.

Similarly, equal frequency division may be introduced in each of the three channels 25, 26 and 27. There is, however, a difficulty in the case where frequency division is introduced, arising from the fact that, depending upon what moment a frequency divider is started one of $d$ alternative phases will appear at its output, where $d$ is the factor by which the divider divides. For example, if one possible phase of the output signal from the frequency divider corresponds to the crest of a particular wave of the input signal then, by restarting the frequency divider one input wave later, the output signal will be shifted in phase by one $d$th of a wave. If such a shift occurred spontaneously, for example, due to temporary loss of the received signal it would give rise to an error in the phase relationship as determined by the phase comparators 30 and 31. For this reason frequency division, if used, should be introduced subsequent to the oscillators 98, 99 and 100.

Because of this ambiguity in the phase of the output of a frequency divider, it is necessary, if frequency dividers are used, that they should be started when the receiver is at a known position. This is necessary in order that the position of the cooperating apparatus as indicated by the phase comparators 30 and 31 may be adjusted to the known position of the vehicle prior to the journey. Thereafter, so long as the frequency dividers operate continuously, no ambiguity in the position of the cooperating apparatus as indicated by the phase comparators 30 and 31 will be introduced.

It should be appreciated that any change in the frequency at which the determination of the phase relationship between the received signals is made will alter the sensitivity of the system, in that it alters the spacing between hyperbolae on which the signals received from a given pair of transmitters have a given phase relationship.

I claim:

1. In a hyperbolic navigation system apparatus comprising radio receiving means to receive first and second input signals having first and second frequencies respectively, these frequencies being different from one another; filter means to separate the first and second input signals into different channels; a device for producing from the first input signal a rotary field, pick-up means coupled with the rotary field, means for producing relative rotation between the pick-up means and the said device, and means for automatically controlling the said relative rotation such that the frequency of the output signal derived from the pick-up means is equal to the frequency of the second input signal; and phase comparing means for determining the phase relationship between the output signal derived from the pick-up means and the said second input signal.

2. Apparatus according to claim 1 wherein the said rotary field is an electromagnetic field.

3. Apparatus according to claim 1 wherein said rotary field is an electrostatic field.

4. Apparatus according to claim 1 wherein the means for producing said relative rotation between the pick-up means and the device is a synchronous electric motor.

5. A hyperbolic navigation system including first, second and third geographically spaced transmitters arranged, in operation, to transmit first, second and third signals respectively having first, second and third frequencies respectively, these frequencies being different from one another, and apparatus which is arranged, in operation, to co-operate with the said transmitters, the said apparatus comprising: radio receiving means to receive the said three signals and to supply three corresponding signals which are hereinafter referred to as the first, second and third input signals respectively and which may have the same frequencies as the received signals; filter means to separate the first, second and third input signals into different channels; a first device for producing from the first input signal a first rotary field, first pick-up means coupled with the first rotary field, means for producing relative rotation between the first pick-up means and the first device, means for automatically controlling the relative rotation between the first pick-up means and the first device such that the frequency of the output signal derived from the first pick-up means is equal to the frequency of said third input signal, and first phase comparing means for determining the phase relationship between the output signal derived from the first pick-up means and the third input signal; a second device for producing from the second input signal a second rotary field, second pick-up means coupled with the second rotary field, means for producing relative rotation between the second pick-up means and the second device, means for automatically controlling the relative rotation between the second pick-up means and the second device such that the frequency of the output signal derived from the second pick-up means is equal to the frequency of the third input signal, and second phase comparing means for determining the phase relationship between the output signal derived from the second pick-up means and the third input signal; the said first and second phase comparing means providing an indication of the geographical location of the said apparatus.

6. A hyperbolic navigation system according to claim 5 wherein said first and second rotary fields are electromagnetic fields.

7. A hyperbolic navigation system according to claim 5 wherein said first and second rotary fields are electrostatic fields.

8. A hyperbolic navigation system according to claim 5 wherein the means for producing said relative rotation between the first pick-up means and the first device and the means for producing said relative rotation between the second pick-up means and the second device are first and second synchronous electric motors respectively.

9. A hyperbolic navigation system according to claim 8 wherein the said means for automatically controlling the relative rotation between the first pick-up means and the first device comprises a first feedback loop including a frequency divider so arranged that, in operation, the first feedback loop supplies to the said first electric motor a signal the frequency and phase of which is dependent upon the frequency and phase respectively of the output signal derived from the first pick-up means, and the said means for automatically controlling the relative rotation between the second pick-up means and the second device comprises a second feedback loop including a frequency divider so arranged, that in operation, the second feedback loop supplies to the second electric motor a signal the frequency and phase of which is dependent upon the frequency and phase respectively of the output signal derived from the second pick-up means.

10. A transmitter for a hyperbolic navigation system according to claim 5 comprises receiver means arranged, in operation, to receive the signal transmitted by another of said transmitters, input means arranged to supply a signal the frequency and phase of which are the same as the frequency and phase of the signal received from said other transmitter by said receiver means, a third device for producing from the signal supplied by said input means a third rotary field, third pick-up means coupled with the third rotary field, means for producing relative rotation between the third pick-up means and the third device, means for automatically controlling the relative rotation between the third pick-up means and the third device such that the frequency of the signal derived from the third pick-up means is equal to the frequency of the signal to be transmitted by the transmitter, and transmitting means whereby said signal is transmitted.

11. A transmitter according to claim 10 wherein said input means includes a local oscillator and a phase discriminator, the output signal from the local oscillator being supplied to said third device and also being supplied to said phase discriminator together with the signal received from said other transmitter, the phase discriminator being arranged to supply a control signal to the local oscillator in dependence upon any difference in phase or frequency between the signal supplied to the phase discriminator by the local oscillator and the signal received from said other transmitter and supplied to the phase discriminator, this control signal controlling the phase and frequency of the output signal from the local oscillator to produce a signal having the same frequency and phase as the signal received from said other transmitter.

12. A transmitter according to claim 10 wherein the said third rotary field is an electromagnetic field.

13. A transmitter according to claim 10 wherein the said third rotary field is an electrostatic field.

14. A transmitter according to claim 10 wherein said means for producing said relative rotation between the third pick-up means and the third device is a third synchronous electric motor.

15. A hyperbolic navigation system including first, second and third geographically spaced transmitters arranged, in operation, to transmit first, second and third signals respectively having first, second and third frequencies respectively, these frequencies being different from one another, but neither the first frequency nor the second frequency differing from the third frequency by more than one kilocycle, and apparatus which is arranged, in operation, to cooperate with the said transmitters, the said apparatus comprising: radio receiving means to receive the said three signals and to supply three corresponding signals which are hereinafter referred to as the first, second and third input signals respectively and which may have the same frequencies as the received signals; filter means to separate the first, second and third input signals into different channels; a first device for producing from the first input signal a first rotary field, first pick-up means coupled with the first rotary field, means for producing relative rotation between the first pick-up means and the first device, means for automatically controlling the relative rotation between the first pick-up means and the first device such that the frequency of the output signal derived from the first pick-up means is equal to the frequency of said third input signal, and first phase comparing means for determining the phase relationship between the output signal derived from the first pick-up means and the third input signal; a second device for producing from the second input signal a second rotary field, second pick-up means coupled with the second rotary field, means for producing relative rotation between the second pick-up means and the second device, means for automatically controlling the relative rotation between the second pick-up means and the second device such that the frequency of the output signal derived from the second pick-up means is equal to the frequency of the third input signal, and second phase comparing means for determining the phase relationship between the output signal derived from the second pick-up means and the third input signal; the said first and second phase comparing means providing an indication of the geographical location of the said apparatus.

References Cited in the file of this patent
UNITED STATES PATENTS

| | | |
|---|---|---|
| 2,408,773 | Goodall | Oct. 8, 1946 |
| 2,626,392 | O'Brien | Jan. 20, 1953 |
| 2,727,231 | Gaudillere | Dec. 13, 1955 |